United States Patent [19]

Matsumoto et al.

[11] Patent Number: 5,291,276
[45] Date of Patent: Mar. 1, 1994

[54] APPARATUS FOR PROCESSING A VIDEO SIGNAL TO GENERATE VIDEO SIGNAL ADJUSTMENT DATA THAT IS SELF-CONTAINED WITH THE VIDEO EQUIPMENT

[75] Inventors: Hiroaki Matsumoto, Chiba; Tokuya Fukuda, Tokyo, both of Japan

[73] Assignee: Sony Corporation, Tokyo, Japan

[21] Appl. No.: 932,253

[22] Filed: Aug. 19, 1992

[30] Foreign Application Priority Data

Aug. 29, 1991 [JP] Japan .................................. 3-244524

[51] Int. Cl.$^5$ .............................................. H04N 9/64
[52] U.S. Cl. ................................... 348/708; 348/180; 348/663; 348/712; 348/713; 348/645; 348/692; 348/655; 348/659
[58] Field of Search ...................... 358/21 R, 29 C, 29, 358/10, 139, 28, 32, 31, 27, 34, 35, 39, 30, 40, 174, 164, 168, 169, 171; H04N 17/02, 9/64, 9/73, 9/73 C, 5/18

[56] References Cited

U.S. PATENT DOCUMENTS

| 4,628,362 | 12/1986 | Waehner | 358/174 |
| 4,799,106 | 1/1989 | Moore | 358/168 |
| 4,970,594 | 11/1990 | Kitaura | 358/174 |

FOREIGN PATENT DOCUMENTS 4-170889  6/1992  Japan .

OTHER PUBLICATIONS

IEEE Journal of Solid-State Circuits vol. 26, No. 5, May 30, 1991, New York US pp. 727-737, L. D. Luna and Kenneth H. 'A Systems Approach to Custom VLSI for a Digital Color Imaging System' p. 732, left column, line 1-right column, line 14.
IEEE 1989 International Conference on Consumer Electronics Digest of Technical Papers ICCE, Jun. 6-9, 1989 Rosemont, Ill. pp. 48-49 M. Kobayashi et al. 'The Digital Video Camera LSI System'.
Fernseh und Kino Technik. vol. 45, No. 7, Jul. 30, 1991, Berlin De pp. 358-362, M. Pochert 'Videokamera mit digitaler Signal verarbeitung'.
NHK Technical Monograph No. 35, Mar. 30, 1985, Tokyo JP pp. 44-55 K. Murakami et al. 'Computer-Control of TV Color Camera'.
JEE Journal of Electronic Engineering. vol. 20, No. 3, Mar. 30, 1983, Tokyo JP pp. 36-40 H. Maeda et al. 'Color Camera Systems Fully Utilizing Microelectronics Technology'.
Electronic Engineering vol. 60, No. 744, Dec. 30, 1988, London GB pp. 25-30, P. Ligertwood 'A digitally controlled colour TV chip with integrated video filters-Part 2'.
NHK Laboratories Note No. 254, Sep. 30, 1980, Tokyo, JP pp. 1-7 K. Murakami et al 'Automatic Setup System for High-Sensitivity Handy Camera'.

*Primary Examiner*—James J. Groody
*Assistant Examiner*—Sherrie Hsia
*Attorney, Agent, or Firm*—William S. Frommer; Alvin Sinderbrand

[57] ABSTRACT

Apparatus that is self-contained with video equipment, such as a video camera or video record/playback device, and which generates video signal adjustment data for use by video signal processing circuits that are included in such video equipment. An input video signal is coupled to luminance and/or chroma digital signal processing circuits which are supplied with luminance or chroma adjustment control data, respectively, for subjecting the input video signal to predetermined luminance or chroma adjustment operations, thereby producing adjusted digital luminance and chroma signals, respectively. At least one of the adjusted digital luminance and chroma signals is sampled at preselected times; and the sampled digital signals are used by an adjustment control data generator for generating the luminance and/or chroma adjustment control data that are supplied to the luminance and/or chroma digital signal processing circuits.

14 Claims, 5 Drawing Sheets

APPARATUS FOR PROCESSING A VIDEO SIGNAL TO GENERATE VIDEO SIGNAL ADJUSTMENT DATA THAT IS SELF-CONTAINED WITH THE VIDEO EQUIPMENT

BACKGROUND OF THE INVENTION

This invention relates to apparatus for processing a video signal, such as may be produced by a video camera or recorded/reproduced by a video tape recorder, and, more particularly, to such apparatus that controls various types of processing operations so as to impart optimum parameters and characteristics to the processed video signal.

Video signal processing of video signals generated or used by video equipment, such as a video camera or a video tape recorder, is well known. Typical types of such signal processing include gamma correction, contour correction, AGC control, black level adjustment, white balance adjustment, hue adjustment, color temperature adjustment, and the like.

Heretofore, when such video equipment, for example, a video camera, is preset for proper corrections and adjustments, the various correction and adjustment control parameters (e.g. a gamma correction control signal, an AGC control signal, a black level adjustment signal, etc.) are set before the video equipment is shipped for distribution, use or sale. The adjustment control parameters are determined as functions of different characteristics of the video signal produced by the video apparatus (e.g. the video signal produced by a video camera) and are established by an ancillary, add-on device that must be connected to the video equipment. Although the adjustment control parameters are determined externally of the video equipment, such parameters are supplied to the video processing circuits included in the video equipment whereat such parameters are used to effect proper gamma correction, contour correction, AGC control, and the like.

An example of how such ancillary parameter-calculating apparatus is used with video equipment, such as a video camera, is illustrated in FIG. 5. For convenience, the video camera is assumed to include a CCD image sensor 90 as the image pickup unit, but it is known that other conventional image pickup devices may be used. The image signal produced by pickup unit 90 is supplied to and processed by a video signal processor 91, which executes gamma correction, contour correction, white balance adjustment, hue adjustment, and various other video control and adjustment operations. As a result, the video signal processor produces a luminance signal Y and a chroma signal C, both properly corrected and adjusted.

The operating levels or parameters for gamma correction, contour correction, white balance adjustment, hue adjustment, etc. of video signal processor 91 are derived from control data stored in a programmable read only memory 92, such as an EEPROM, or other non-volatile memory. Such stored control data are read out from the memory by a system controller 93, converted to analog form by a digital-to-analog (D/A) converter 94 and supplied to the individual processing circuits included in video signal processor 91. Thus, depending upon the values of the control data stored in EEPROM 92, the corresponding corrections and adjustments in the video signal produced by pickup unit 90 are made by video signal processor 91.

To generate the proper control data to be stored in EEPROM 92, the luminance and chrominance signals Y and C produced by the video camera are analyzed. Such analysis is made by an external adjustment apparatus 100 which, as shown in FIG. 5, is electrically connected to the video camera. The adjustment apparatus includes a microprocessor 103 that is suitably programmed to calculate the individual control and adjustment parameters to obtain optimum gamma correction, contour correction, white balance adjustment, hue adjustment, etc. This is achieved by digitizing the luminance and chrominance signals produced by the video camera and detecting the digitized video signals by a wave detector 102. In this regard, an analog-to-digital (A/D) converter 101 is selectively coupled by way of a switch to receive either the luminance signal Y or the chroma signal C and to digitize the luminance and chroma signals supplied thereto. Wave detector 102 is coupled to A/D converter 101 and detects level information and phase information of the digitized luminance signal Y and the digitized chroma signal C. It is this detected level and phase information that is supplied to microprocessor 103 and used thereby to calculate the different control parameters needed to effect optimum gamma correction, contour correction, white balance adjustment, hue adjustment, etc. For example, if the detected level and phase information differ from predetermined reference levels, the microprocessor calculates those control parameters which, when supplied to video signal processor 91, result in corrections and adjustments to the video signal such that the level and phase information that is detected by wave detector 102 is substantially equal to such predetermined reference levels. It is seen that the calculated control parameters are supplied from microprocessor 103 of adjustment apparatus 100 to D/A converter 94 included in the video camera, whereat such control parameters are converted to analog form and used by video signal processor 91 for gamma correction, contour correction, etc. The closed loop formed of the video signal processor, A/D converter 101, wave detector 102, microprocessor 103 and D/A converter 94 operates such that optimum control parameters are generated by the microprocessor; and these control parameters are written into memory 92 by system controller 93. Thereafter, adjustment apparatus 100 may be disconnected from the video camera; but the control parameters stored in memory 92 nevertheless control video signal processor 91 to carry out optimum control and adjustment operations on the video signal derived from pickup unit 90.

It is apparent that the prior art arrangement shown in FIG. 5 does not permit's resetting or readjustment of the control parameters stored in memory 92 once adjustment apparatus 100 is disconnected from the video camera. Thus, modifications or resetting of such control parameters, which may be needed over a period of time, are not easily attainable without reconnecting adjustment apparatus 100. Such adjustment apparatus often is quite expensive and is constructed as a rather large piece of equipment, thus making it expensive and inconvenient to sell such adjustment apparatus along with the video camera with which it may be used. Alternatively, if the adjustment apparatus normally is furnished only to skilled technicians, it may be difficult, bothersome and expensive for the user of the video camera to seek the assistance of such technicians for occasional resetting of the control parameters. Thus, the quality of the video signal produced by the video camera may deteriorate because adjustments to the control parameters used by the video signal processor are not made.

The foregoing difficulties are equally applicable to other video equipment, such as video tape recorders, that include video signal processors which are supplied with control parameters that may require adjustment from time to time.

OBJECTS OF THE INVENTION

Therefore, it is an object of the present invention to provide apparatus for generating video signal adjustment data to correct or adjust video data, which apparatus is self-contained within video equipment, such as a video camera, a record/playback device, or the like.

Another object of this invention is to provide apparatus that is easily usable by a user of video equipment so as to produce adjustment control parameters for video signal processing circuits and thereby effect automatic corrections and adjustments in a video signal.

A further object of this invention is to provide digital video signal processing circuitry that is self-adjustable to produce a video signal exhibiting optimum parameters.

An additional object of this invention is to provide digital video signal processing circuitry which is automatically adjustable to produce gamma correction, contour correction, white balance adjustment, hue adjustment, and the like, of a video signal.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for generating video signal adjustment data for use by video signal processing circuits of the type that are included in video equipment, such as video cameras, video record/playback devices, and the like. This apparatus is self-contained with the video equipment and includes luminance and chroma digital signal processors supplied with luminance and chroma adjustment control data, respectively, for subjecting an input video signal, such as may be produced by the video camera, to predetermined, respective, luminance and chroma adjustment operations so as to produce adjusted digital luminance and chroma signals. A sampling circuit operable at preselected times samples at least one of the adjusted digital signals, and an adjustment control data generator is responsive to the sampled digital signals for generating luminance and/or chroma adjustment control data that is/are supplied to the luminance and/or chroma digital signal processors.

In one embodiment, the input video signal is supplied to the luminance and chroma digital signal processors by an amplitude adjuster, such as an AGC circuit, whose gain control signal is produced by the adjustment control data generator and is supplied to a register coupled thereto for establishing such amplitude adjustments. In another embodiment, the input video signal is supplied to the luminance and chroma digital signal processors by a DC level adjuster, such as a black level adjuster, whose operation is controlled by level adjustment control data generated by the adjustment control data generator and stored in a register coupled thereto.

In yet another embodiment, the chroma digital signal processor includes a white balance adjuster that is supplied with weighting control data produced by the adjustment control data generator as a function of the adjusted digital chroma signal that is sampled.

In a further embodiment, the chroma digital signal processor includes a hue adjuster that is controlled by hue weighting control data produced by the adjustment control data generator in response to the adjusted digital chroma signal that is sampled.

As a feature of this invention, closed loops are formed by the luminance digital signal processor, the sampler and the adjustment control data generator and by the chroma digital signal processor, the sampler and the adjustment control data generator, whereby the adjustment control data that is produced is fed back to the luminance and chroma digital signal processors and is modified automatically, for example, with each cycle, until the processed digital luminance and chroma signals exhibit optimum characteristics.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF CERTAIN PREFERRED EMBODIMENTS

Figure 1:
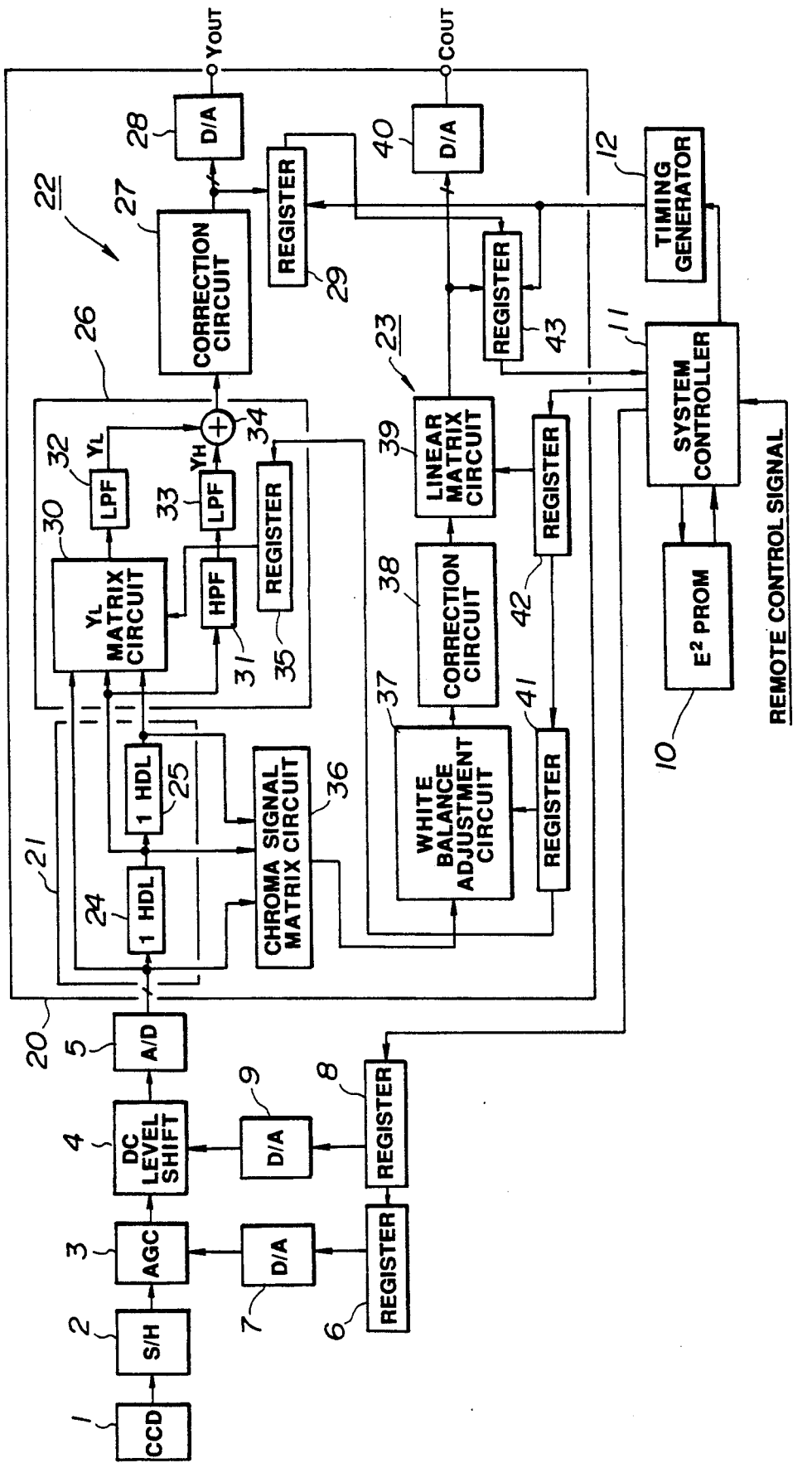
FIG. 1 is a block diagram of one embodiment of video signal processing apparatus in accordance with the present invention.

Referring now to FIG. 1, there is illustrated, in block diagram form, one embodiment of the present invention which is shown in the environment of a color video camera such as a so-called single-plate camera which uses a CCD image sensor 1 as the image pickup device. Here, the CCD image sensor is provided with a supplementary color coating film and produces an image output signal of complementary color components read out from each of the CCD elements in succession by a sample-and-hold circuit 2. It is appreciated that this CCD image sensor and sample-and-hold circuit are conventional and form no part of the present invention per se. It will also be appreciated that other image pickup devices may be used from which luminance and chroma output signals $Y_{OUT}$ and $C_{OUT}$ are derived by digital signal processor 20 which is supplied with the image signal.

In FIG. 1, which will be described in greater detail below, an input section is coupled to derive an input video signal from the image signal produced by the image pickup unit of the video camera. As an example, this input section is comprised of an automatic gain control (AGC) circuit 3, a DC level shift circuit 4 and an analog-to-digital (A/D) converter 5. AGC circuit 3 is adapted to control the amplitude of the output luminance signal $Y_{OUT}$ produced by digital signal processor 20. Accordingly, the AGC circuit serves to amplify the image signal produced by the image pickup device in accordance with a gain control signal supplied to the AGC circuit from a register 6 in which the gain control signal is stored. In the preferred embodiment, this stored gain control signal is in digital form, and a digital-to-analog (D/A) converter 7 is coupled to register 6 to convert the digital gain control signal to analog form and supply that analog gain control signal to AGC circuit 3. As will be described, this digital gain control signal is stored in a non-volatile memory 10, such as, but not limited to, an electronically erasable programmable read only memory (EEPROM). The manner in which this gain control signal is produced and stored in the EEPROM will be described below.

DC level shift circuit 4 is coupled to AGC circuit 3 and is adapted to adjust the DC level of the output luminance signal $Y_{OUT}$ eventually produced by digital signal processor 20. More particularly, the DC level shift circuit operates to control the black level of the luminance signal to be equal to a predetermined, reference black level. The amount of DC level adjustment to be made to the output luminance signal is determined by a black level control signal that is supplied to DC level shift circuit 4 from a register 8. This black level control signal is another of the digital adjustment and correction control signals stored in EEPROM 10. Since the black a level control signal stored in register 8 is in digital form, and since DC level shift circuit 4 is an analog circuit (in the embodiment described herein), a D/A converter 9 is coupled to register 8 to convert the digital signal to analog form and supply the analog black level control signal to the DC level shift circuit.

The video signal whose amplitude and DC level have been adjusted by AGC circuit 3 and DC level shift circuit 4 is supplied to digital signal processor 20 by A/D converter 5. This A/D converter samples the input video signal at a sampling rate sufficient to produce individual pixels, and each pixel is represented by a 10-bit digital signal. These digitized pixels are coupled to digital signal processor 20 which, in the preferred embodiment, is fabricated on a single IC chip.

Digital signal processor 20 is comprised of a delay circuit 21, a luminance digital signal processor 22 and a chroma digital signal processor 23. Delay circuit 21 is comprised of cascaded delay circuits 24 and 25, each adapted to impart a delay equal to the time period of one horizontal scan line (or 1H) to the digitized pixels successively supplied thereto by A/D converter 5. Thus, delay circuits 24 and 25 are referred to as 1H delay circuits. The output of A/D converter 5, the output of 1H delay circuit 24 and the output of 1H delay circuit 25 are supplied to luminance digital signal processor 22 and also to chroma digital signal processor 23. Thus, each of these digital signal processors is supplied with digitized pixels exhibiting 0H delay, 1H delay and 2H delay.

Luminance digital signal processor 22 includes a luminance data generator 26 to which the 0H, 1H and 2H delayed pixels are supplied. The luminance data generator includes a matrix circuit 30 adapted to generate luminance data $Y_L$ representing luminance information in a relatively lower frequency band, a low pass filter 32 coupled to the output of matrix circuit 30, a high pass filter 31 coupled to receive the 1H delayed pixel data from delay circuit 21, a low pass filter 33 coupled to high pass filter 31 and an adder 34 coupled to the outputs of low pass filters 32 and 33. Matrix circuit 30 is supplied with the 0H, 1H and 2H delayed pixels from delay circuit 21 from which the low frequency band luminance data $Y_L$ is produced. This luminance data $Y_L$ is supplied to adder 34 by low pass filter 32. It will be appreciated that the matrix circuit combines the 0H, 1H and 2H delayed pixels in a particular ratio so as to produce the low band luminance data $Y_L$. This ratio is determined by control data stored in a register 35 and supplied therefrom to matrix circuit 30. Such combining ratio may be adjusted to provide corrections for color temperature, and the combining ratio control data stored in register 35 may be thought of as color temperature control data. Thus, as this color temperature control data is adjusted (as will be described), the combining ratio of the 0H, 1H and 2H delayed pixels likewise is adjusted to correct the low band luminance data $Y_L$ for variations in color temperature.

High pass filter 31 is coupled to the output of 1H delay circuit 24 to extract data $Y_H$ in a relatively higher frequency band. Low pass filter 33 minimizes higher frequency noise and supplies the extracted high band luminance data $Y_H$ to adder 34 whereat it is combined with low band luminance data $Y_L$. The resulting luminance data produced by adder 34 is coupled to a gamma correction circuit 27 from which the gamma-corrected luminance data is converted to analog form by a D/A converter 28 and supplied as an output luminance signal $Y_{OUT}$ to further apparatus (not shown). The output of gamma correction circuit 27 also is coupled to a register 29 which is supplied with timing signals by a timing generator 12 so as to sample the luminance data processed by luminance digital signal processor 22 at preselected times. Depending upon such sampling times, different characteristics and parameters of the processed luminance data are sampled, such as the black level, a white level, etc. Timing generator 12 is controlled by system controller 11,.as will be described.

Chroma digital signal processor 23 includes a chroma signal matrix circuit 36 coupled to delay circuit 21 to combine the 0H, 1H and 2H delayed pixels to produce chroma data. Matrix circuit 36 is conventional and further description thereof is not provided herein. The output of the chroma signal matrix circuit is coupled to a white balance adjustment circuit 37 which operates to adjust the individual chroma components supplied thereto by matrix circuit 36 by multiplying same with weighting coefficients stored in a register 41. Such white balance weighting coefficients are adjustable, as will be described, and are supplied to register 41 from memory 10 in which white balance weighting control data as well as other adjustment and correction control data are stored.

The white balance adjusted chroma data produced by white balance adjustment circuit 37 are supplied to a gamma correction circuit 38, which may be conventional, and the gamma-corrected chroma data are coupled to a linear matrix circuit 39 for hue adjustment. The linear matrix circuit is adapted to adjust the chroma components supplied thereto by multiplying same with hue adjustment weighting coefficients coupled thereto from a register 42. Such weighting coefficients are referred to as hue adjustment control data, and this control data is applied to register 42 from memory 10.

The chroma data output of linear matrix circuit 39 has been white balance adjusted, gamma corrected and hue adjusted, and this chroma data is sampled at preselected times by a sampling register 43. This register is supplied with suitable timing pulses by timing generator 12 under the control of system controller 11. Such timing pulses determine the sampling times of the digitally processed chroma data which, in turn, samples particular characteristics and parameters of the chroma information, such as white balance, hue, etc.

The digitally processed chroma data produced by linear matrix circuit 39 is converted to analog form by a D/A converter 40 to supply a chroma output signal $C_{OUT}$ for use by other apparatus (not shown).

Memory 10, which may be an EEPROM, as aforementioned, is bidirectionally coupled to system controller 11 which writes correction and adjustment control data (referred to hereafter for simplicity simply as adjustment control data) thereinto and reads such adjustment control data to registers 6, 8, 35, 41 and 42. The system controller preferably is comprised of a suitably programmed microprocessor which generates adjustment control data in response to the sampled luminance and chroma data obtained by registers 29 and 43, respectively. Changes in the adjustment control data generated by system controller 11 are made until the samples of luminance and chroma data are substantially equal to predetermined or desired values.

The manner in which the apparatus illustrated in FIG. 1 generates and utilizes video signal adjustment control data now will be described. Image pickup device 1 is pointed to a color bar test chart to image the usual color information included thereon. Thus, the input video signal supplied to digital signal processor 20 represents such color bar test chart and the luminance and chrominance output signals $Y_{OUT}$ and $C_{OUT}$ produced by the processor are derived from the image information on that chart. Samples of the digital luminance output signal produced by luminance digital signal processor 22 are obtained by register 29 at preselected times, and system controller 11 generates black level control data, gain control data and color temperature control data as a function of such luminance samples. Thereafter, samples of the digitized chroma data produced by chroma digital signal processor 23 are obtained by register 43 at discrete, preselected times, and system controller 11 generates white balance control data and hue adjustment data as a function of such chroma samples. One illustrative sequence in which adjustments to the luminance data and adjustments to the chroma data are made is represented by the flow chart shown in FIG. 3.

Figure 3:
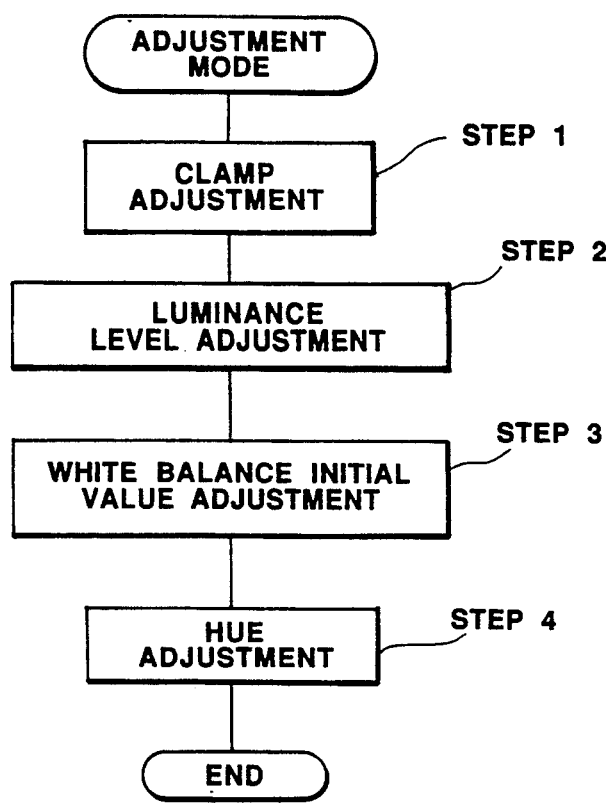
FIG. 3 is a flow chart representing the manner in which adjustment operations are carried out by the system controller used with the present invention.

Preferably, although not necessarily, clamp adjustment processing is performed, as represented by step 1 in the flow chart of FIG. 3. In clamp adjustment processing, the black level of the luminance data provided at the output of luminance digital signal processor 22 is sampled or fetched, and stored in register 29 by supplying to this register timing signals that coincide with the occurrence of the black level in the video signal imaged by image pickup device 1. This black level sample is supplied from register 29 to system controller 11 whereat the difference between the sampled black level and a reference black level is calculated. The system controller generates black level control data of a magnitude which, when supplied to DC level shift circuit 4, results in a black level adjustment such that the calculated difference is nulled. This generated black level control data is supplied to register 8 whereat it is used to control the DC level shift imparted to the video signal by DC level shift circuit 4. At a subsequent black level sampling time, it is expected that the black level sample obtained by register 29 will be substantially equal to the aforementioned reference black level. However, if not, system controller 11 generates and supplies to register 8 new black level control data. This cyclical operation is repeated until the luminance data produced by luminance digital signal processor 22 exhibits a black level that is substantially equal to the reference black level. At that time, the black level control data that is supplied to register 8 by system controller 11 also is stored in memory 10.

After the clamp adjustment operation is performed, the luminance level adjustment operation is carried out, as represented by step 2 in the flow chart of FIG. 3. Now, register 29 is supplied with timing signals from timing generator 12 which coincide with the occurrence of the scanning of white data on the color bar test chart. Accordingly, the white level of the digital luminance data produced by luminance digital signal processor 22 is obtained or fetched by register 29 and supplied to system controller 22. The system controller calculates the difference between this sampled white level and a reference white level and generates gain control data as a function of such difference. This gain control data is supplied from the system controller to register 6 and is used by AGC circuit 3 to set the gain, or amplitude, of the input video signal supplied to digital signal processor 20. Register 29 is operated once again to sample the white level of the digital luminance signal provided at the output of the luminance digital signal processor, and the difference, if any, between this sampled white level and the reference white level is calculated by the system controller to modify the gain control data stored in register 6. This cyclical operation is repeated until the sampled white level is substantially equal to the reference white level. At that time, the gain control data supplied to register 6 by system controller 11 also is stored in memory 10.

After generating the desired gain control data, system controller 11 performs a further operation in accordance with the luminance level adjustment routine represented by step 2 in FIG. 3. Now, register 29 is operated by timing signals which coincide with scanned red and blue portions of the color bar-test chart so as to sample or fetch the digital luminance data that is produced in response to such red and blue portions. These samples represent color temperatures, and such color temperature samples obtained by register 29 are supplied to system controller 11 which calculates the difference between these sampled color temperature levels and reference color temperature levels. Color temperature adjustment data is generated as a function of such difference and supplied by the system controller to register 35 whereat such color temperature adjustment data is used by matrix circuit 30 to provide color temperature correction by adjusting the combining ratio in which the 0H, 1H and 2H delayed pixels are combined. Then, the digital luminance signal produced at the output of luminance digital signal processor 22 is sampled once again to obtain further color temperature samples which, in turn, are compared to the reference color temperature levels by system controller 11. This cyclical operation is repeated until the color temperature adjustment data supplied to register 35 results in color temperatures that are substantially equal to the reference color temperatures. At that time, the color temperature adjustment data that is supplied by system controller 11 to register 35 also is stored in memory 10.

After carrying out the luminance level adjustment operation described above, system controller 11 advances to perform a white balance adjustment routine, as represented by step 3 in the flow chart of FIG. 3. In this routine, the level of the digital chroma signal produced at the output of chroma digital signal processor 23 at the time that the white portion of the color bar test chart is scanned is sampled or fetched. It is appreciated that such sampling is obtained by supplying register 43 with timing signals that coincide with such scanning. The sampled digital chroma signal obtained by register 43 is supplied to system controller 11 which determines whether a white balance adjustment is,,needed. For example, if the chroma data sample differs from a predetermined value, the system controller generates white balance weighting data which is supplied to register 41 and used by white balance adjustment circuit 37 to vary the weighting coefficients with which the chroma signals produced by chroma signal matrix circuit 36 are multiplied. Then, the digital chroma signal produced at the output of the chroma digital signal processor is sampled once again, and this cyclical operation is repeated until the white balance adjustment is data stored in register 41 results in chroma samples of proper value. At that time, a proper white balance is obtained, and the white balance adjustment data that had been supplied to register 41 by system controller 11 is stored in memory 10.

After the white balance adjustment operation is carried out, as aforementioned, system controller 11 advances to step 4 of the flow chart shown in FIG. 3 to carry out a hue adjustment operation. Register 43 now is supplied with timing signals which coincide with the scanning of particular portions of the color bar test chart, thereby sampling or fetching color difference data in the digital chroma data produced at the output of chroma digital signal processor 23. Such color difference data samples are supplied from register 43 to system controller 11 which generates hue adjustment weighting data as a function of such color difference samples. For example, if the color difference samples differ from reference samples, the system controller generates hue adjustment data which varies the weighting coefficients with which the chroma data are multiplied in linear matrix circuit 39. Then, the color difference data produced at the output of the chroma digital signal processor are sampled once again; and the foregoing cyclical operation is repeated until the hue adjustment data supplied to register 42 by system controller 11 results in digital chroma data of predetermined hue. At that time, the hue adjustment data also is stored in memory 10.

Figure 4:
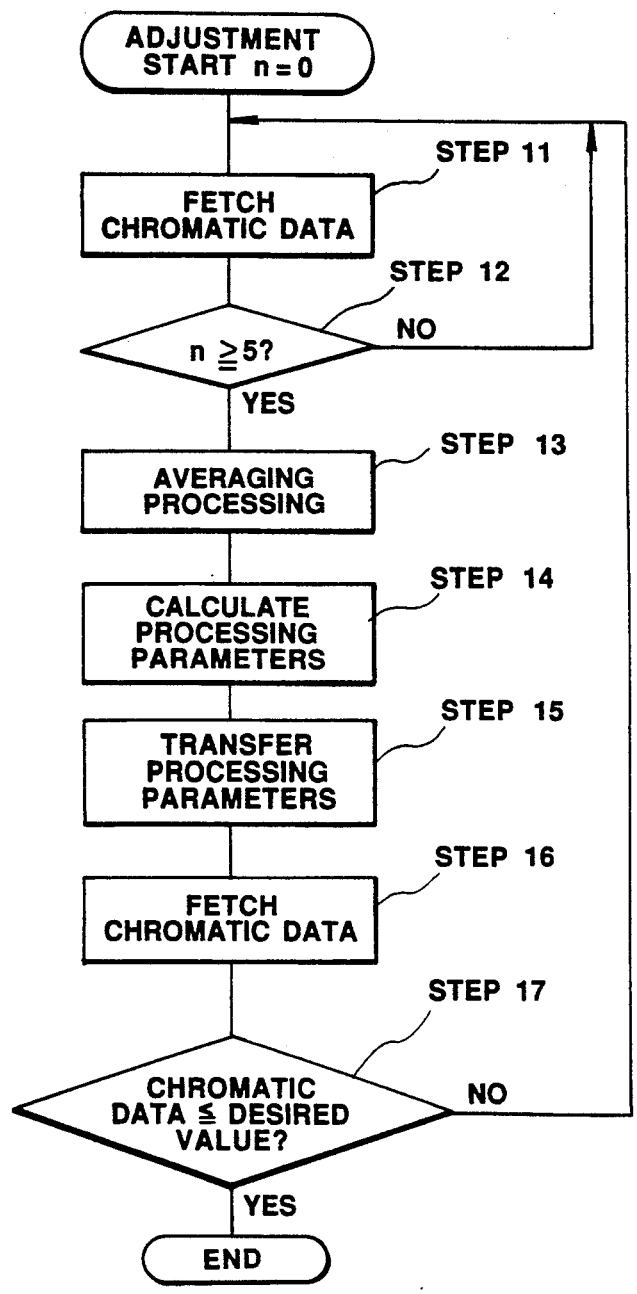
FIG. 4 is a flow chart representing, as an example, the hue adjustment routine carried out by the present invention.

A more detailed description of the hue adjustment routine executed by system controller 11 now is described in conjunction with the flow chart shown in FIG. 4. At the beginning of this routine, a cyclical count P, representing the number of color difference data samples that are obtained by register 43, is reset to 0. Then, as represented by step 11, a timing signal is supplied to register 43 to sample, or fetch, the color difference data included in the digital chroma signal produced at the output of chroma digital signal processor 23. This sample obtained by the register is supplied to system controller 11 and the cyclical count n is incremented by 1. Then, inquiry is made, at step 12, to determine if this cyclical count n is equal to or greater than 5. If not, that is, if five samples of the color difference data have not been obtained, the routine cycles through steps 11 and 12 until such five samples are supplied to the system controller. Once five samples have been obtained by register 43, the inquiry of step 12 is answered in the affirmative and the routine advances to step 13.

Now, the five color difference data samples are averaged and, based upon such average value of the color difference data, the hue adjustment control data is generated, as represented by step 14. This calculated hue adjustment control data is transferred from system controller 11 to register 42, as represented by step 15. Linear matrix circuit 39 is controlled by such hue adjustment control data to multiply the chroma data supplied thereto from gamma correction circuit 38 by weighting coefficients which are determined by the hue adjustment control data. Hence, the linear matrix circuit performs a hue adjustment operation on the chroma data.

The hue-adjusted chroma data produced at the output of the linear matrix circuit then is sampled once again by register 43 in response to timing signals generated by timing generator 12, as represented by step 16. The sampled, hue-adjusted color difference data fetched by the register is supplied to system controller 11 which now inquires, at step 17, if this sampled color difference data is equal to or less than a desired, or reference value. If this inquiry is answered in the affirmative, the hue adjustment operation is complete and the hue adjustment control data that had been transferred to register 42 and that had resulted in the desired hue adjustment is stored in memory 10. However, if the sampled color difference data is greater than its desired value, the inquiry of step 17 is answered in the negative and system controller 11 repeats the hue adjustment routine of FIG. 4.

Figure 5:
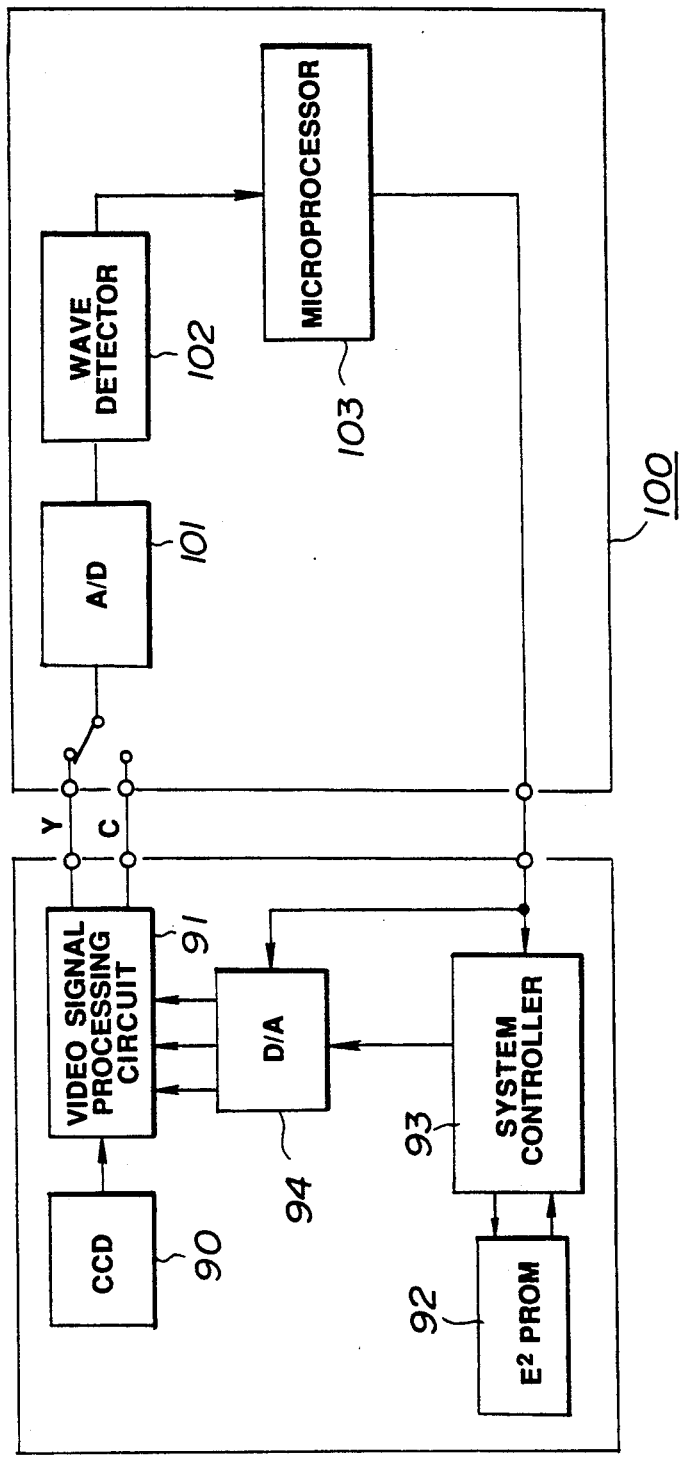
FIG. 5 is a block diagram of a video camera connected to an external adjustment parameter generator, for purposes of comparison with the present invention.

Thus, in accordance with this embodiment of the present invention, it is appreciated that video equipment, such as a color video camera, is provided with a self-contained, automatic adjustment arrangement to produce adjustment control data that is used by the video signal processing circuitry of the video equipment to effect a proper initial set-up condition. As described herein, when the video camera images a color bar test chart, proper gain control data, black level control data, color temperature adjustment data, white balance control data and hue adjustment control data are generated by system controller 11 in response to the digital luminance and chroma data derived from the imaged color bar test chart, and such control data is supplied to AGC register 6, DC level shift register 8, luminance matrix circuit register 35, white balance adjustment register 41 and register 42 to effect control over AGC circuit 3, DC level shift circuit 4, luminance matrix circuit 30, white balance adjustment circuit 37 and linear matrix circuit 39, respectively. Registers 29 and 43 are triggered, or enabled, by timing pulses supplied thereto from timing generator 12 so as to sample the digital luminance and chroma data at times corresponding to the scanning of particular portions of the color bar test chart. Thus, adjustment control data is obtained by the present invention without requiring the connection of external adjustment apparatus to the video camera, such as shown in FIG. 5, thereby facilitating modifications in the set-up condition of the video equipment, as may be needed over time, by the user. Hence, adjustments to the set-up condition that may be needed over time, and which heretofore have required the skill of a suitably trained technician, which is expensive and time-consuming to the user of the video equipment, can be avoided.

Figure 2:
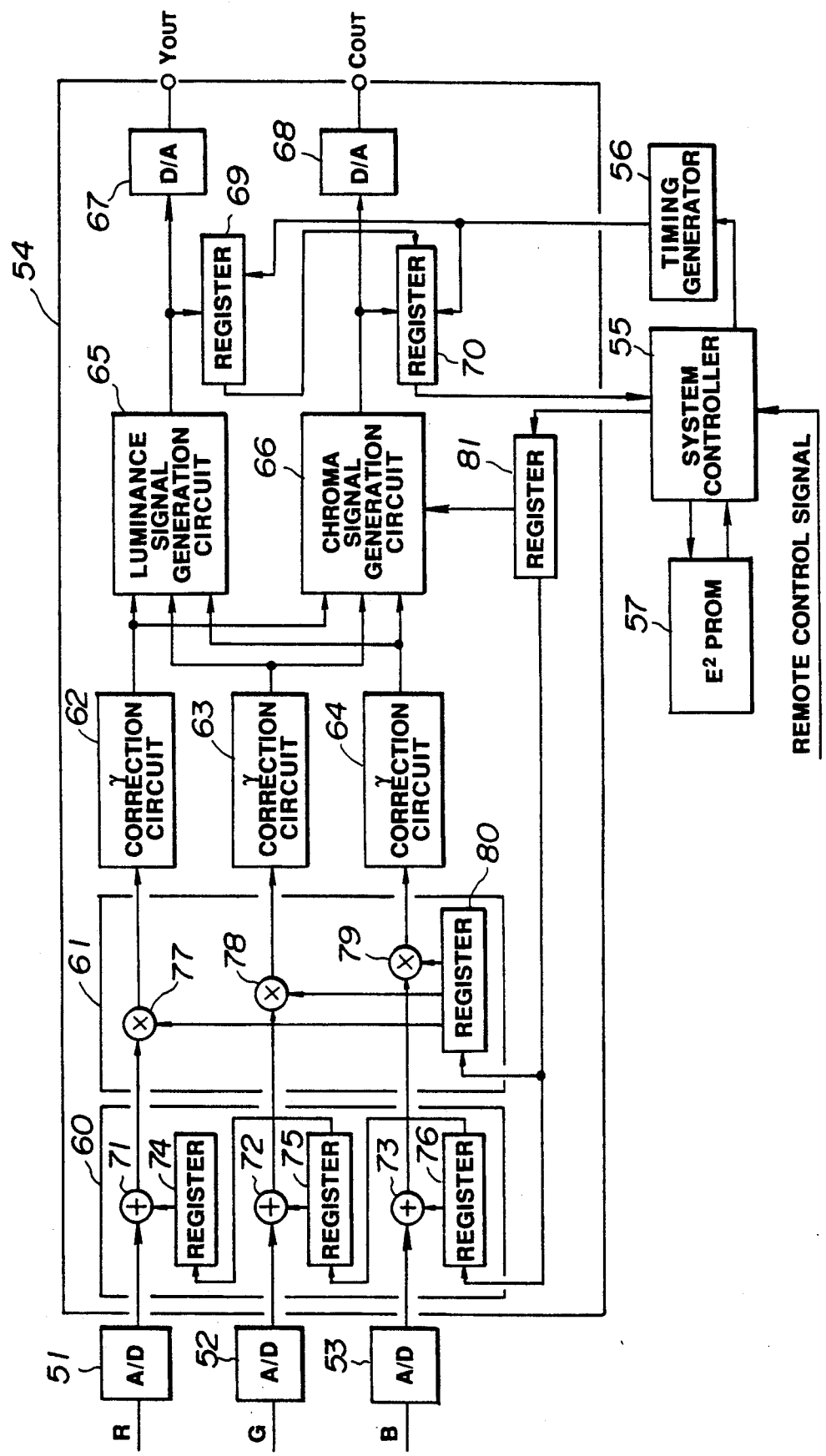
FIG. 2 is a block diagram of another embodiment of the present invention.

Another embodiment of the present invention now is described in conjunction with the block diagram shown in FIG. 2. In this embodiment, a digital signal processor 54 is used with an image pickup device of the type commonly referred to as a three-plate pickup unit which generates the usual three primary color components red, green and blue (RGB). The digital signal processor includes a clamp circuit 60, adapted to clamp each of the digital color components to a reference black level, a white balance adjustment circuit 61, a luminance signal generator 65 and a chroma signal generator 66. Clamp circuit 60 includes red, green and blue clamp sections of substantially identical structure. The red clamp section is comprised of an adder 71 and a register 74, the latter storing clamp level data which is summed with a digitized red color component supplied from an A/D converter 51. As the clamp level data stored in register 74 varies, the black level to which the digital red color component is clamped likewise varies.

Similarly, the green clamp section included in clamp circuit 60 includes an adder 72 coupled to a register 75, the latter storing clamp level data that is summed with a digitized green color component coupled to adder 72 by an A/D converter 52. Finally, the blue clamp section includes an adder 73 coupled to a register 76, the latter storing clamp level data which is summed with a digitized blue color component supplied to adder 73 by an A/D converter 53. It will be appreciated that, depending upon the black level to which the digital red, green and blue color is components are clamped, a luminance signal derived from these color components exhibits a corresponding black level.

The clamp level data supplied to registers 74, 75 and 76 are produced by a system controller 55 and stored in and retrieved from a memory 57, such as EEPROM. As will be described below, system controller 55 and EEPROM 57 may be similar to aforedescribed system controller 11 and EEPROM 10 of the embodiment shown in FIG. 1.

White balance adjustment circuit 61 is coupled to clamp circuit 60 and includes multipliers 77, 78 and 79 coupled to adders 71, 72 and 73, respectively, adapted to multiply the respective digital R, G and B components by white balance weighting coefficients supplied to the multipliers by a register 80. Register 80 is coupled to system controller 55 to receive therefrom white balance control data which establishes the weighting coefficients with which the R, G and B components are multiplied. As these weighting coefficients vary, the white balance of the chroma data produced by digital signal processor 54 likewise changes.

White balance adjustment circuit 61 is coupled to luminance signal generator 65 and also to chroma signal generator 66 by gamma correction circuits 62, 63 and 64. Each of these gamma correction circuits is adapted to provide gamma correction for a respective one of the white balance adjusted color components R, G and B. Thus, gamma correction circuit 62 couples the output of multiplier 77 to luminance signal generator 65 and to chroma signal generator 66. Similarly, gamma correction circuit 63 couples the output of multiplier 78 to the luminance and chroma signal generators 65 and 66. Finally, gamma correction circuit 64 couples the output of multiplier 79 to the luminance and chroma signal generators. In this manner, white balance adjusted and gamma-corrected R, G and B color components are supplied both to luminance signal generator 65 and to chroma signal generator 66.

Luminance signal generator 65 is adapted to combine the R, G and B color components supplied thereto in a predetermined ratio to produce luminance data Y. This luminance data is converted from its digital form to an analog luminance output signal $Y_{OUT}$ by a D/A converter 67. A register 69, which may be similar to aforedescribed register 29 of FIG. 1, is coupled to the output of luminance signal generator 65 to sample, or fetch, the luminance data at preselected times in response to timing signals supplied thereto by a timing generator 56. This timing generator is coupled to and controlled by system controller 55. It will be appreciated that the timing signals produced by the timing generator coincide with the scanning of particular portions of a color bar test chart that is imaged by the video camera during a setup adjustment operation.

Chroma signal generator 66 combines the R, G and B color components supplied thereto in a predetermined ratio determined by hue adjustment data coupled from a register 81. This hue adjustment data is generated by system controller 55 and stored in memory 57 from which it is retrieved to initiate a set-up operation. It will be appreciated that such hue adjustment data may be weighting coefficients with which the R, G and B color components are multiplied. As such weighting coefficients are varied, the hue of the chroma data produced at the output of chroma signal generator 66 likewise varies.

The digital chroma data produced at the output of the chroma signal generator is converted to analog form by a D/A converter 68 to produce a chroma output signal $C_{OUT}$. The digital chroma data produced at the output of chroma signal generator 66 also is sampled, or fetched, by a register 70 under the control of timing signals produced by timing generator 56 to supply to system controller 55 the chroma data produced at preselected times which correspond to portions of the color bar test chart then being scanned by the video camera.

In operation, when the video camera, which includes the digital signal processor shown in FIG. 2, images a color bar test chart, timing generator 56 is controlled by system controller 55 to generate timing pulses to carry out different setup operations to establish the proper initial setup conditions for the processing circuitry included in the digital signal processor. Register 69 operates to sample the luminance data produced by luminance signal generator 65 representing the black level of the video signal produced by the camera. The system controller compares this sampled black level to a desired, reference black level and calculates clamp level data sufficient to make the sampled black level substantially equal to the desired black level. This clamp level data is supplied to registers 74, 75 and 76 to adjust the black clamp level of the R, G and B color components, thus adjusting the black level of the luminance data produced by luminance signal generator 65. The foregoing operation is repeated by the system controller until the actual black level of the luminance data is substantially equal to the desired black level. At that time, the clamp level data which results in the proper black level is stored in memory 57.

Timing generator 56 also supplies timing signals to register 70 to sample, or fetch, the digital chroma data produced by chroma signal generator 66 at preselected times corresponding to the scanning of a white portion of the color bar test chart. The sampled chroma data produced by chroma signal generator 66 is supplied to system controller 55 which calculates the proper white balance weighting coefficients from the sampled chroma data and supplies such white balance weighting coefficients to register 80. These weighting coefficients are used to multiply the R, G and B color components, and the foregoing operation is repeated cyclically until the white balance weighting coefficients result in chroma data samples having the proper, desired white balance level. At that time, system controller 55 writes such weighting coefficients, or white balance control data, into memory 57.

The timing signals supplied to register 70 also are used to sample, or fetch, the chroma data produced by chroma signal generator 66 at preselected times suitable for sensing the hue of the chroma data. System controller 55 generates hue adjustment data which determines the ratio at which the R, G and B components are combined by chroma signal generator 66 to result in chroma data of the proper, desired hue. Such hue adjustment data is coupled from the system controller to register 81, resulting in a hue adjustment of the chroma data, and the foregoing operation is repeated cyclically until the hue of the chroma data samples is substantially equal to a desired hue. At that time, the hue adjustment data produced by the system controller is written into memory 57.

From the foregoing discussion, it is seen that memory 57 thus stores the desired, initial adjustment data for establishing the proper black level, white balance and hue of the video signal produced by the video camera. Since memory 57 is a non-volatile memory, such data remains stored therein even when the camera is not in use, such as when it is turned off. Hence, when a user next wishes to utilize the video camera, such adjustment data is read from memory 57 and supplied to registers 76, 80 and 81 to establish the desired set-up condition of the camera. Moreover, when such initial set-up condition should be varied, as when the operating characteristics of the digital signal processor vary over time, such adjustment data stored in memory 57 may be modified by using the video camera to image a color bar test chart in the manner discussed above. Thus, and like the embodiment shown in FIG. 1, the present invention permits a user of video equipment, such as a video camera, to establish and correct set-up conditions for digital video signal processing circuitry without requiring the attachment to such video equipment of external adjustment apparatus of the type shown in FIG. 5. Hence, gain control, black level control, color temperature control, white balance control, hue control, etc. may be effected by the user without returning the video equipment for factory adjustment and without seeking the particular expertise and skill of a highly trained technician.

While the present invention has been particularly shown and described with reference to preferred embodiments, it will be readily appreciated by those of ordinary skill in the art that various changes and modifications may be made without departing from the spirit and scope of the invention. For example, system controller 11 or system controller 55 may operate in an automatic, sequential mode to adjust the various operating parameters of the video signal processing circuitry or, alternatively, individual adjustments to desired operating parameters may be made by selecting the parameter to be adjusted, such as by keyboard selection. Also, although memory 10 and memory 67 have been described as EEPROMs, it is appreciated that other non-volatile memory devices may be used; and it is desired that the data stored in such non-volatile memory devices may be modified, as may be needed. Thus, other types of programmable read only memories may be substituted for the EEPOMs described herein.

Therefore, it is intended that the appended claims be interpreted as including the embodiments specifically described herein, those alternatives and modifications that have been discussed and suggested above, as well as all other equivalents thereto.

What is claimed is:

1. Apparatus for generating video signal adjustment data for use by video signal processing circuits of the type that are included in video equipment, said apparatus being self-contained with video equipment and comprising:
   input means for providing an input video signal to be processed by said video signal processing circuits;
   luminance digital signal processing means supplied with luminance adjustment control data for subjecting said input video signal to predetermined luminance adjustment operations to produce adjusted digital luminance signals;
   chroma digital signal processing means supplied with chroma adjustment control data for subjecting said input video signal to predetermined chroma adjustment operations to produce adjusted digital chroma signals;
   sampling means for selectively sampling at least one of the adjusted digital luminance and chroma signals at preselected times; and
   adjustment control data generating means coupled to said sampling means and responsive to the sampled digital signals for generating at least one of said luminance and chroma adjustment control data and for supplying said at least one of said luminance and chroma adjustment control data to at least one of said luminance and chroma digital signal processing means to subject said input video signal to luminance and chroma adjustment operations, respectively.

2. The apparatus of claim 1 wherein said input means includes amplitude adjusting means responsive to amplitude adjustment control data for adjusting the amplitude of said input video signal; wherein said sampling means samples an adjusted digital luminance signal; and wherein said adjustment control data generating means is responsive to the sampled adjusted digital luminance signal for generating amplitude adjustment control data and for supplying said amplitude adjustment control data to said amplitude adjusting means.

3. The apparatus of claim 2 wherein said amplitude adjusting means comprises analog automatic gain control (AGC) means, register means for storing said amplitude adjustment control data, and digital-to-analog converting means coupled to said register means for converting the stored amplitude adjustment control data to an analog gain control signal and for supplying said analog gain control signal to said AGC means for controlling the gain thereof.

4. The apparatus of claim 1 wherein said input means includes DC level adjusting means responsive to level adjustment control data for adjusting the DC level of said input video signal; wherein said sampling means samples an adjusted digital luminance signal; and wherein said adjustment control data generating means is responsive to the sampled adjusted digital luminance signal for generating level adjustment control data and for supplying said level adjustment control data to said DC level adjusting means.

5. The apparatus of claim 4 wherein said DC level adjusting means comprises analog black level shift means, register means for storing said level adjustment control data, and digital-to-analog converting means coupled to said register means for converting the stored level adjustment control data to an analog black level control signal and for supplying said analog black level control signal to said black level shift means.

6. The apparatus of claim 1 wherein said adjustment control data generating means includes a system controller operative to cyclically control said sampling means to obtain cyclical samples of said at least one of the adjusted digital luminance and chroma signals, and to generate said at least one of said luminance and chroma adjustment control data cyclically until at least one of the adjusted digital luminance and chroma signals corresponds to a desired signal value.

7. The apparatus of claim 6 wherein said adjustment control data generating means further includes memory means for storing for subsequent retrieval the at least one of said luminance and chroma adjustment control data generated by said system controller when said at least one of the adjusted digital luminance and chroma signals corresponds to said desired signal value.

8. The apparatus of claim 1 wherein said luminance digital signal processing means includes color temperature correction means, said sampling means includes means for fetching an adjusted digital luminance signal, and said adjustment control data generating means is operative to generate color temperature control data in response to fetched digital luminance data and to supply said color temperature control data to said color temperature correction means.

9. The apparatus of claim 8 wherein said input video signal comprises pixel data derived from a CCD image pickup device, said apparatus includes delay means for delaying said pixel data to produce 0H, 1H and 2H delayed pixel data (where H is a unit delay substantially equal to a horizontal line period), said color temperature correction means includes matrix means for combining said 0H, 1H and 2H delayed pixel data in accordance with a controllable combining ratio, and said color temperature control data comprises matrix coefficient data for controlling the combining ratio with which said matrix means combines said 0H, 1H and 2H delayed pixel data.

10. The apparatus of claim 1 wherein said chroma digital signal processing means includes white balance adjustment means, said sampling means includes means for fetching an adjusted digital chroma signal, and said adjustment control data generating means is operative to generate white balance control data in response to the fetched adjusted digital chroma signal and to supply said white balance control data to said white balance adjustment means.

11. The apparatus of claim 10 wherein said input video signal represents a color bar test chart scanned by a video camera, and said adjustment control data generating means includes timing means for providing timing signals to said means for fetching at times corresponding to the scanning of a white portion of said color bar test chart by said video camera.

12. The apparatus of claim 11 wherein said input video signal comprises pixel data derived from a CCD image pickup device; said apparatus includes delay means for delaying said pixel data to produce 0H, 1H and 2H delayed pixel data (where H is a unit delay substantially equal to a horizontal line period); said chroma digital signal processing means further includes chroma matrix means for combining said 0H, 1H and 2H delayed pixel data to produce color difference components to be adjusted, and hue adjustment matrix means for weighing said color difference components with controllable weighting coefficients; said timing means provides further timing signals at times corresponding to the scanning by said video camera of color portions of said color bar test chart; and said adjustment control data generating means is further operative to generate said weighting coefficients in response to the fetched adjusted digital chroma signal, said fetched adjusted digital signal being fetched by said sampling means in response to said further timing signals.

13. The apparatus of claim 11 wherein said input video signal comprises digital color components; said white balance adjustment means comprises multiplier means for multiplying respective digital color components with white balance weighting coefficients; and said white balance control data generated by said adjustment control data generating means comprises said white balance weighting coefficients.

14. The apparatus of claim 13 wherein said chroma digital signal processing means further includes combining means for combining respective white-balanced-weighted digital color components in a controllable combining ratio to determine hue; said timing means provides further timing signals at times corresponding to the scanning by said video camera of color portions of said color bar test chart; and said adjustment control data generating means is further operative to generate combining ratio data for said combining means in response to the fetched adjusted digital chroma signal that is fetched by said sampling means in response to said further timing signals and thereby control the hue of said adjusted digital chroma signals.

* * * * *